(12) United States Patent
Kim

(10) Patent No.: US 7,346,373 B2
(45) Date of Patent: Mar. 18, 2008

(54) DEVICE AND METHOD FOR ORGANIZING A MENU IN A MOBILE COMMUNICATION TERMINAL

(75) Inventor: Jae-Hwan Kim, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 132 days.

(21) Appl. No.: 10/649,002

(22) Filed: Aug. 27, 2003

(65) Prior Publication Data
US 2004/0048607 A1 Mar. 11, 2004

(30) Foreign Application Priority Data
Sep. 9, 2002 (KR) ............... 10-2002-0054249

(51) Int. Cl.
*H04B 1/38* (2006.01)
(52) U.S. Cl. ............... 455/566; 455/418; 455/170.1; 455/186.1; 455/186.2
(58) Field of Classification Search ............ 455/418, 455/566, 425, 170.1, 186.1, 186.2, 550.1, 455/556.2, 567; 345/157, 653, 649; 348/14.03
See application file for complete search history.

(56) References Cited

U.S. PATENT DOCUMENTS

| 5,303,388 A * | 4/1994 | Kreitman et al. ........... 715/836 |
|---|---|---|
| 5,678,015 A | 10/1997 | Goh |
| 5,724,492 A * | 3/1998 | Matthews et al. .......... 345/419 |
| 5,995,104 A | 11/1999 | Kataoka et al. |
| 6,184,884 B1 * | 2/2001 | Nagahara et al. ........... 715/828 |
| 6,993,362 B1 * | 1/2006 | Aberg ........................ 455/566 |
| 2001/0006388 A1 * | 7/2001 | Kim et al. .................. 345/418 |
| 2001/0028369 A1 | 10/2001 | Gallo et al. |
| 2001/0053708 A1 * | 12/2001 | Sugiyama et al. .......... 455/566 |
| 2001/0055038 A1 * | 12/2001 | Kim .......................... 345/810 |
| 2002/0111139 A1 * | 8/2002 | Nishiyama et al. .......... 455/41 |
| 2004/0171363 A1 * | 9/2004 | Minakuchi ............... 455/170.1 |

FOREIGN PATENT DOCUMENTS

| CN | 1344392 A | 4/2002 |
|---|---|---|
| EP | 1 469 374 | 10/2004 |
| WO | WO 02/46900 | 6/2002 |

\* cited by examiner

*Primary Examiner*—Duc M. Nguyen
*Assistant Examiner*—Dai Phuong
(74) *Attorney, Agent, or Firm*—The Farrell Law Firm, PC

(57) ABSTRACT

A device for organizing a menu in a mobile communication terminal. The device comprises a control unit for dynamically generating and deleting a plurality of menu planes according to a user's setting, each plane including at least one menu item; a control unit for providing a mechanism of multi-dimensional navigation between the generated menu planes; and a display unit for receiving the menu planes from the control unit and displaying the received menu planes under control of the control unit.

12 Claims, 6 Drawing Sheets

DEVICE AND METHOD FOR ORGANIZING A MENU IN A MOBILE COMMUNICATION TERMINAL

PRIORITY

This application claims priority to an application entitled "Device and Method for Organizing a Menu in a Mobile Communication Terminal", filed in the Korean Industrial Property Office on Sep. 9, 2002 and assigned Ser. No. 2002-54249, the contents of which are hereby incorporated by reference.

BACKGROUND OF THE INVENTION

1. Field of the Invention

The present invention relates generally to a device and a method for organizing a menu in a mobile communication terminal, and more particularly to a device and a method for organizing a menu in a mobile communication terminal, which enables a user to create a desired menu by providing an algorithm for generation of multi-dimensional dynamic menu-planes and cursor movements there between.

2. Description of the Related Art

Currently, along with the development of technologies, a mobile communication terminal is provided with functions for using various services such as Internet service, short message service (SMS), and multimedia service, as well as the conventional audio communication service. Particularly, with a function for using multimedia or photograph service provided in the mobile communication terminal, a demand is sharply increasing for a color liquid crystal display. As use of such color mobile communication terminals spreads, interest in mobile user interface (hereinafter, referring to as "UI") design is increasing.

A conventional mobile communication terminal generally has a main menu on the screen, which is composed of an icon array and a background animation, and in which movement between different menus and the menu's extension is diversely performed. A DIY (Do It Yourself) menu, which is a user-organizing menu applied to new models of mobile communication terminals, is also limited in both its functions and the usage range. The DIY menu enables the user to register menu items frequently used by the user from all menus available in the mobile communication terminal menus to create a user menu.

A currently available user menu enables a user to register his or her desired menu items in a predetermined number of previously-set icon boxes at desired positions, as well as to set icons for the registered user menu items.

FIG. 1 illustrates a user-setting menu screen in a conventional mobile communication terminal. For example, when 12 icon boxes are previously set in a user-setting menu, a user can set 12 menu items. Even when the user sets no user menu items, a default basic-slot menu configuration is provided and up/down/left/right movements of a cursor between the menu items are made using direction keys.

Referring to FIG. 1, six menu icons of two rows and three columns are displayed on a screen 10. A user may select his or her desired menu icons by moving a menu-selection box or a cursor using direction keys such as up/down/left/right keys. When the menu-selection box is positioned in a message-management menu icon 6, a user must push the direction key at least three times in order to move the menu-selection box to a terminal-management menu icon 1. In addition, in order to select menu icons not displayed on the screen 10, a user must push a direction key, with the menu-selection box positioned in the menu icon 6.

Thus, without using a short key, a large number of key manipulations are required for the user to move to another menu item or to a submenu registered as a lower hierarchical level, and although most people commonly use menus, there is no characteristic feature of the menus.

SUMMARY OF THE INVENTION

Therefore, the present invention has been designed in view of the above problem, and the present invention in one aspect provides a device and a method for organizing a menu in a mobile communication terminal that provides a user with an interesting dynamic menu display, thereby enabling quick menu-access to a high-level user. The menu may also include a three-dimensional effect, consequently improving the utilization of the menu.

In accordance with one embodiment of the present invention, the above and other objects are accomplished by a device for organizing a menu in a mobile communication terminal, comprising: a control unit for dynamically generating and deleting a plurality of menu planes according to a user's setting, each plane including thereon at least one menu item; a control unit for providing a mechanism of multi-dimensional navigation between the generated menu planes; and a display unit for receiving the menu planes from the control unit and displaying the received menu planes under control of the control unit.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

A preferred embodiment of the present invention provides a basic menu plane enabling a user to easily select menu icons, a menu extension mechanism, a menu movement method, and a menu access mode for a high-level user.

Figure 1:
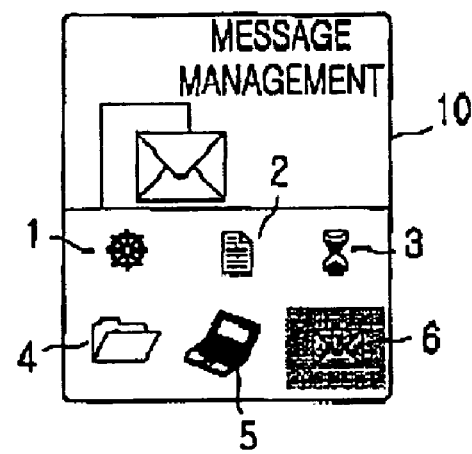
FIG. 1 illustrates a user-setting menu screen in a general mobile communication terminal.
Figure 2:
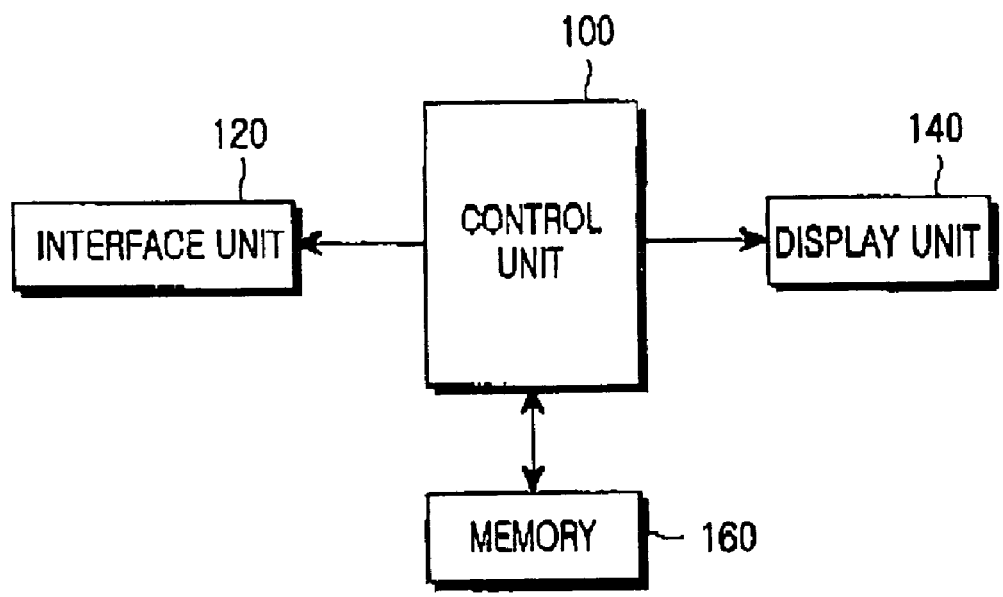
FIG. 2 is a block diagram illustrating a mobile communication terminal according to an embodiment of the present invention.

FIG. 2 is a block diagram illustrating a mobile communication terminal according to an embodiment of the present invention. Referring to FIG. 2, a control unit 100 controls the overall operation of the mobile communication. In addition, the control unit 100 forms a basic menu plane as will be described below in detail, and enables a display unit 140 to display the basic menu plane. Further, the control unit 100 dynamically generates or removes a menu plane each time a predetermined number of items, for example, four menu items are added or removed, respectively. When the user moves a menu selection box along menu icons so that the menu selection box moves from a first menu plane, displayed in the display unit 140, to a second menu plane, the control unit 100 enables the display unit 140 to display a dynamic three-dimensional image, a moving hexahedron or other polyhedron that selectively includes first, second, third, . . . , etc. menu planes. That is, as illustrated in FIG. 3B, as the menu selection box moves from a first menu plane to a second menu plane, the hexahedron or other polyhedron rotates to show one menu plane initially and then another menu plane.

The display unit 140 displays various messages, etc., under the control of the control unit 100. For example, the display unit 140 is a LCD (Liquid Crystal Display), or TFT (Thin Film Transistor) LCD. An interface unit 120 includes a plurality of number and function keys, and transmits input data, corresponding to a key selected by a user, to the control unit 100. For example, the interface unit 120 may include up/down/left/right arrow keys for enabling movement of the menu selection box in the basic menu plane displayed on the screen of the display unit as described above. Such an interface unit 120 may include a commonly used key matrix or touch screen. When the interface unit 120 is embodied with a touch screen, a plurality of number keys, function keys, and arrow keys, etc., displayed on the touch screen, may be selected by an input instrument such as a stylus pen.

Figure 3A:
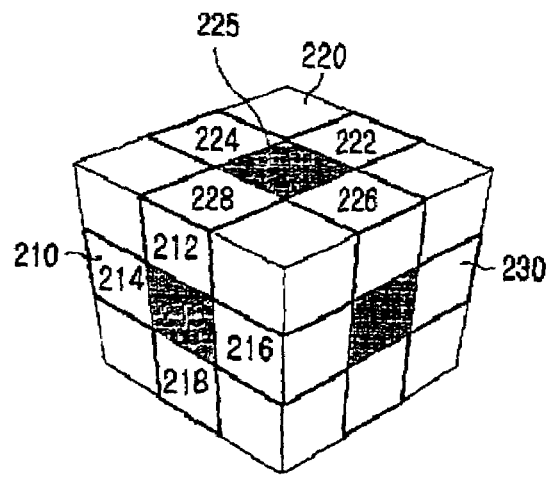
FIG. 3A illustrates a basic menu plane according to an embodiment of the present invention.
Figure 3B:
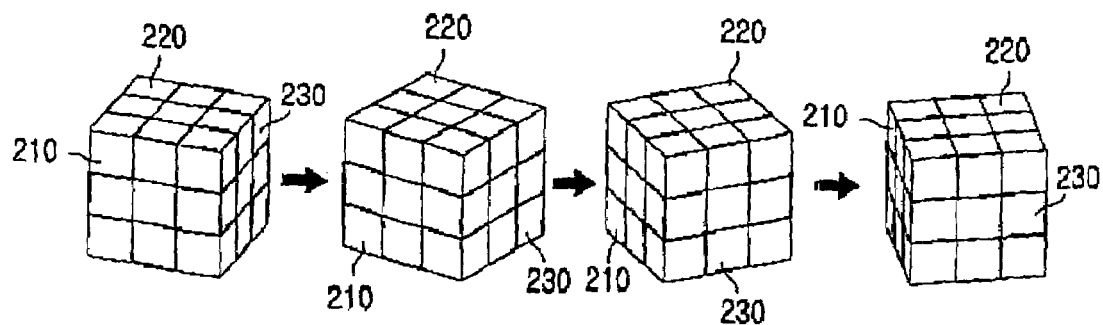
FIG. 3B illustrates inter-plane cursor movement according to the present invention.

FIG. 3A is a view illustrating a basic menu plane, and FIG. 3B is a view illustrating a cursor movement between menu planes displayed in the display unit. Referring to FIGS. 3A and 3B, the basic menu plane 210 has a rectangular image, equally divided into 9 parts, for example, that is displayed when the user pushes a menu key. A basic menu plane 210 includes a menu icon box 215 positioned in the center, and four user menu registration slots 212, 214, 216, and 218 to which the menu selection box can move from the menu icon box 215 by selecting or pushing a key once. A menu icon is disposed in each of the user menu registration slots 212, 214, 216, and 218. The control unit 100 disposes a management menu item of mobile communication terminal in the menu icon box 215 in the center. A management menu in the menu icon box 215 includes submenus for defining functions related to a user-menu setting such as user menu registering, removing, and moving functions, changing icons, and changing of a menu item name. The management menu is referred to as a terminal management menu. In addition, the terminal management menu may further include a function of setting high/low-level user modes. A user menu may be added, for example, in a start-menu registration portion of the terminal management menu, and may be deleted in a start-menu deletion portion thereof. In addition, the user menu icons may be changed, for example, in a main-screen setting portion thereof.

Menu registration icon boxes in the basic menu plane 210, which can be set by a user, comprise four user menu registration slots 212, 214, 216, and 218 to which the menu selection box can move from the menu icon box 215 by selecting or pushing a key once. Accordingly, as the number of menu items registered by the user exceeds 4, a new menu plane is generated. A menu item in the center of the new menu plane also becomes the terminal management menu item. Also, when a number of new menu planes are generated, the terminal management menu is always positioned in their menu registration slot in the center. Further, the control unit 100 generates or removes a menu plane dynamically each time four menu items are added or removed. In addition, the control unit 100 enables the user to move the menu selection box from one menu plane to other menu plane using a direction key or a menu key. In detail, provided that the menu selection box or a curser is positioned at one of the user menu registration slots 212, 214, 216 and 218 shown in FIG. 3A, selecting or pressing a direction key from the menu slot where the cursor is positioned enables movement of the cursor to another menu plane. For example, if the up arrow key is pushed when a cursor is positioned on the user menu registration slot 212 of a menu plane 210, then the cursor moves to the menu registration slot 228 of the menu plane 220. If the right arrow key is pushed when the cursor is positioned on the user menu registration slot 216 of the menu plain 210, then the cursor moves to the menu registration slot 224 of a menu plain 220.

Referring to FIG. 3A, if a user pushes the up arrow key when a user cursor is positioned on the user menu registration slot 212 of the basic menu plain 210, then the menu plain 220 is displayed on the screen of the display unit 140. Herein, the cursor is basically positioned on the lower menu slot 228 of the menu plain 220 in case of moving to the menu plain 220 from the user menu registration slot 212 previously positioned. If there is no registered menu in the menu slot 220, then the cursor is positioned on the menu icon box 225 of the menu plain 220.

Here, when the cursor or the menu selection box moves from one menu plane to another menu plane, an upper one 212 of four menu registration slots of said one menu plane 210 is connected to a lower one 228 of four menu registration slots of said another menu plane 220. In addition, a lower one 218 of the four menu registration slots of said one menu plane 210 is connected to an upper one (it is not shown in FIG. 3) of the four menu registration slots of said another menu plane, and a left one 214 of the four menu registration slots of said one menu plane 210 is connected to a right one (it is not shown in FIG. 3A) of the four menu registration slots of said another menu plane. Finally, a right one 216 of the four menu registration slots of said one menu plane 210 is connected to a left one 224 of the four menu registration slots of said another menu plane 220. That is, the menu is configured as if a number of menu planes are spatially connected to each other. Actually, the connection is made within the user's thought, not the real space. In detail, the position of the menu planes is not specified in real space, but the position of the next or subsequent menu plane is determined according to the user's thought process. Further detail regarding the menu item connections will be described with reference to FIGS. 4 and 5 hereinafter.

Here, if there is no menu item registered in the menu registration slot in said another menu plane, connected to the menu registration slot in said one menu plane, the cursor or the menu selection box moves from the menu registration slot in said one menu plane to a terminal management menu in the center of said another menu plane.

If there is no registered menu in the menu slot where the cursor is to be positioned and the previous menu plain is continued upon a cursor moving from the basic menu plain to one of other menu plains by a key input of a user according to the above-mentioned movement rule, then the cursor is positioned on the menu icon box 215 in order to reduce the unnecessary key input.

In addition, in response to the inter-plane cursor movement, the control unit 100 enables the display unit 140 to display a rotating three-dimensional image, a hexahedron or other polyhedron including one menu plane and another menu plane, such that its front view is changed from said one menu plane to said another menu plane as illustrated in FIG. 3B.

In a preferred embodiment, the maximum number of menu items in one menu plane, which can be registered by a user, is four. If the user registers an additional menu item, with four menu items previously registered by the user, the control unit 100 generates a new menu plane internally, and registers the additional menu item. Here, the number of the additional menu item registered by the control unit 100 is one. However, when the user moves the cursor to the new menu plane using the direction key, the control unit 100 enables the new menu plane to inherit three menu items from said one menu plane, besides the one additional menu item. That is, when there are empty menu slots in the new menu plane, in which no menu item is registered, the control unit 100 displays the menu items in the previous menu plane corresponding to the empty menu slots in position in the empty menu slots. The menu item's inheritance is to give the user a further chance to select a menu rather than keep the empty menu slots as they are, thereby reducing unnecessary movements of the cursor. According to the present invention, there is no limit on the maximum number of menu planes. However, when permitting a short key access by using number keys provided in the mobile communication for the user's convenience, it may be preferable to set the maximum number of the menu planes to three.

According to the present invention, in one embodiment, the control unit 100 may dispose four basic menu items as a default in the first menu plane. In addition, a user may change the default menu items to other menu items, but not delete them. This limitation on the deletion is to provide the user with at least one menu plane when the user pushes the menu key, consequently providing the user with complete GUI service and basic accessibility to the menu functions.

In this case, when a user adds a new menu item to the existing menu items, the control unit 100 automatically generates a new menu plane, and registers the new menu item to the new menu plane. It is to be noted that newly added menu items are registered in each menu plane in sequence of menu slots 212→214→216→218, referring to FIG. 3A. In one embodiment, when there are three menu planes, the maximum number of menu items that may be registered is twelve, and access to each menu item may be made by using a number key corresponding to a number assigned to each menu item.

Figure 4:
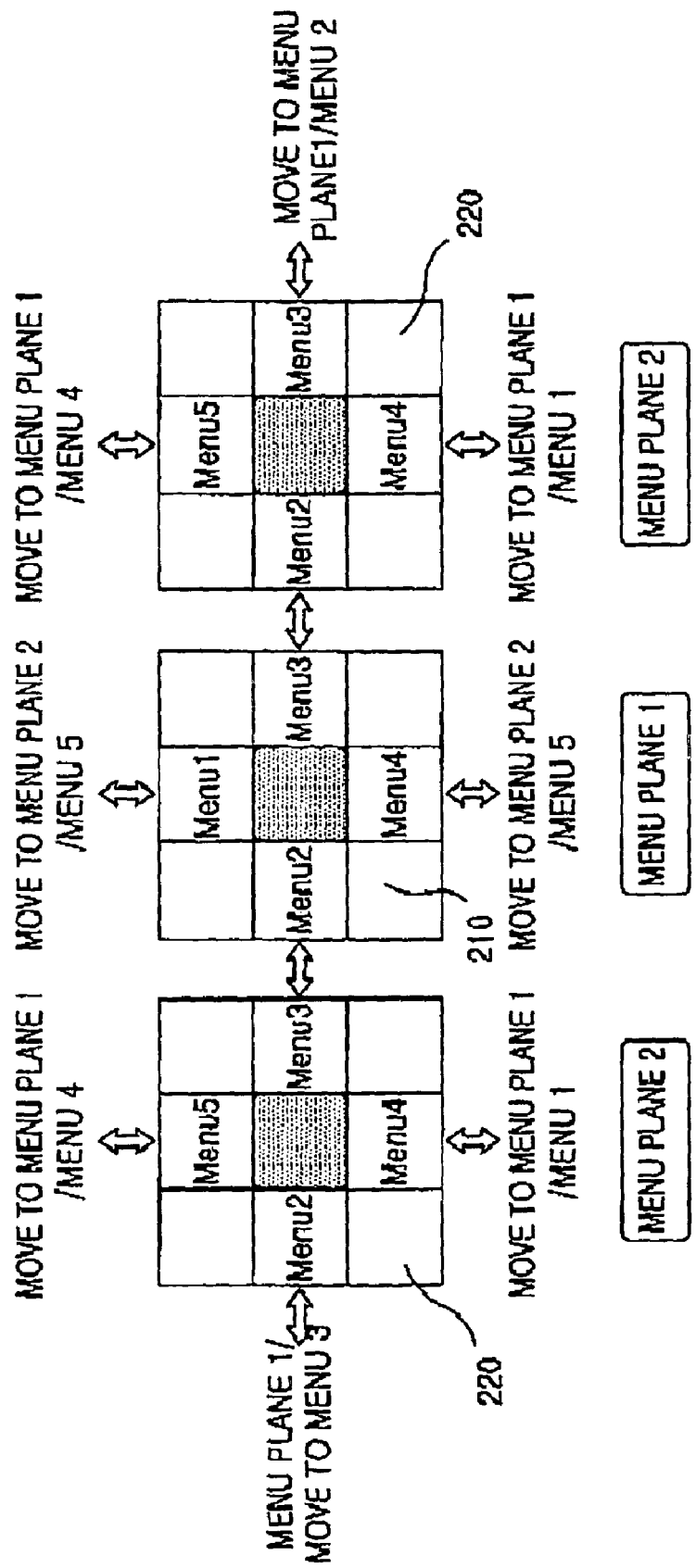
FIG. 4 illustrates where a menu item is added according to an embodiment of the present invention.
Figure 5:
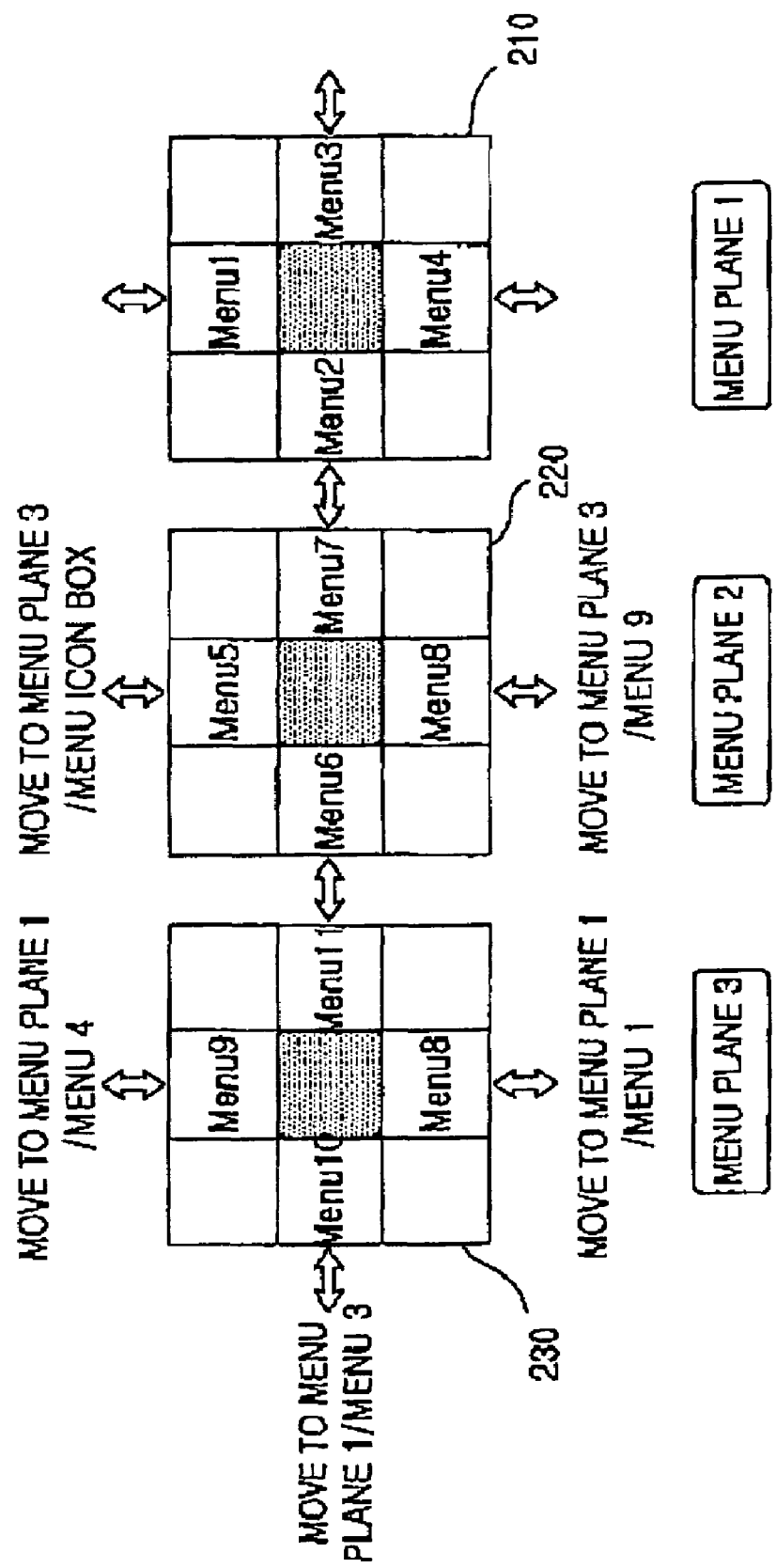
FIG. 5 illustrates where there are three menu planes according to an embedment of the present invention.

FIG. 4 illustrates where a menu item is added according to an embodiment the present invention, and FIG. 5 illustrates where there are three menu planes according to an embodiment of the present invention.

Referring to FIGS. 2 to 5, the control unit 100 enables a user to register, delete, and change a user menu in a terminal management menu positioned in the center of the menu plane. When the user registers a new menu in the terminal management menu, a new menu plane is generated internally, and the registered menu item is placed in the upper menu slot of the second menu plane. For example, when additional menu items are registered (for example, menu 9) after finishing the registration up to a menu 8 on menu plane 2 220, the control unit 100 generates a new menu plane 3 as indicated by numeral 230 in FIG. 5, and enables its empty menu slots to inherit the corresponding ones from the menu plane 2 220. When a menu item in any position is deleted, the control unit 100 automatically realigns the menu items of each menu plane, and removes an unnecessary menu plane by the menu plane's deletion.

When there is no menu item additionally registered by the user in the menu plane 1 210, the cursor movement between menus occur in this menu plane only. In a case where a user registers an additional menu to generate the menu plane 2 220, the user may move a cursor to the menu plane 2 220 by pushing a direction key from the menu plane 1 210. When, upon moving from the menu plane 1 210 to the menu plane 2 220, there is no menu item in the new position, the new position inherits the corresponding menu item from the previous menu plane as shown in FIG. 4, and the cursor is placed in the terminal management box in the center. On the other hand, if there is a registered menu item in the new menu plane, the cursor is placed in the registered menu item.

When three menu planes are formed as illustrated in FIG. 5, when the user moves a cursor from the "menu 2" to "menu 7", a cursor movement back to the previous menu plane is allowable through "menu 7". That is, when a cursor movement is made between menu planes, the cursor movement's path is stored in a memory in the mobile communication terminal, so that a user may move a cursor between the menu planes along the path.

In FIG. 5, if a user pushes the left arrow key when the cursor is positioned on Menu 2 of the menu plain 210 and the cursor moves to the menu plain 220, then the cursor is to be positioned on Menu 7 of the menu plain 220. Herein, the Menu 7 of the menu plain 220 is a menu slot connected to the previous menu plain 210. Such a menu slot connected to other menu plain is referred to as entry point. The menu slots of the entry point are varied on the number of menu plain. If the right arrow key is pushed in Menu 7, the cursor moves to the menu plain 210. And, in movement of the cursor by a direction key at the remaining menu slots Menu 5, Menu 6 and Menu 8 of the menu plain 220, if there is a menu plain other than the menu plain 210, the cursor moves to the menu plain. For example, in FIG. 5, the cursor positioned on Menu 5, Menu 6 and Menu 8 moves to other menu plain, i.e., the menu plain 230. However, if there is no menu plain 230 and there is only two menu plains 210 and 220, the cursor should move only to the menu plain 210 from the menu plain 220.

Selecting any one of direction keys with the cursor placed on a menu item in the menu plane 2 220, other than the right direction key at "menu 7", moves a cursor to a new menu plane, i.e., a menu plane 3 230. Similarly, selecting any one of direction keys with the cursor placed on a menu item in the menu plane 3 230, other than the right direction key at "menu 11", moves a cursor to the menu plane 1 210. Subsequent operations are performed in the same manner. When a user pushes the menu key the first time, no previous menu plane exists, and therefore all the next planes become the menu plane 2 220. However, when the user continues to push the direction key, reentering the menu plane 1 210 through the menu plane 3 230, the user enables a cursor to move to the menu plane 3 230 through an entry point or the menu plane 2 220.

Figure 6:
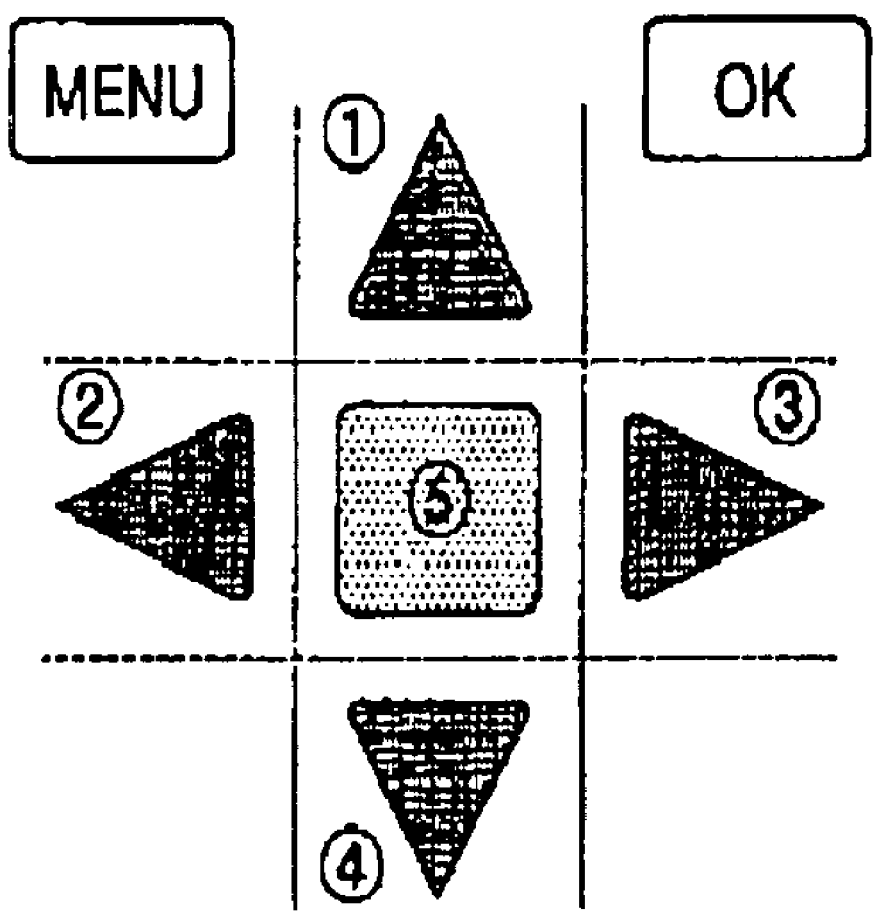
FIG. 6 illustrates a high-level user menu mode according to an embodiment of the present invention.

FIG. 6 is a view illustrating a high-level user menu mode according to the present invention.

The present invention, in one embodiment, provides a high-level user menu mode in a terminal management menu. This high-level user menu mode is configured by a combination of the menu key and the direction key, which enables both a cursor movement between the planes and selection of the menu items. That is, when a mobile communication terminal has key arrays as illustrated in FIG. 6, a user may display a menu screen by pushing a "Menu" key in a standby state. In the high-level user mode, the "Menu" key is used for the inter-plane cursor movements. In addition, four direction keys 1, 2, 3, 4 are mapped to four menu items in the corresponding positions, respectively, and a key in the center corresponds to a terminal management menu 5. In this case, a user may perform an inter-plane cursor movement by selecting the menu key once, and activate the menu items using the corresponding direction keys.

Figure 7:
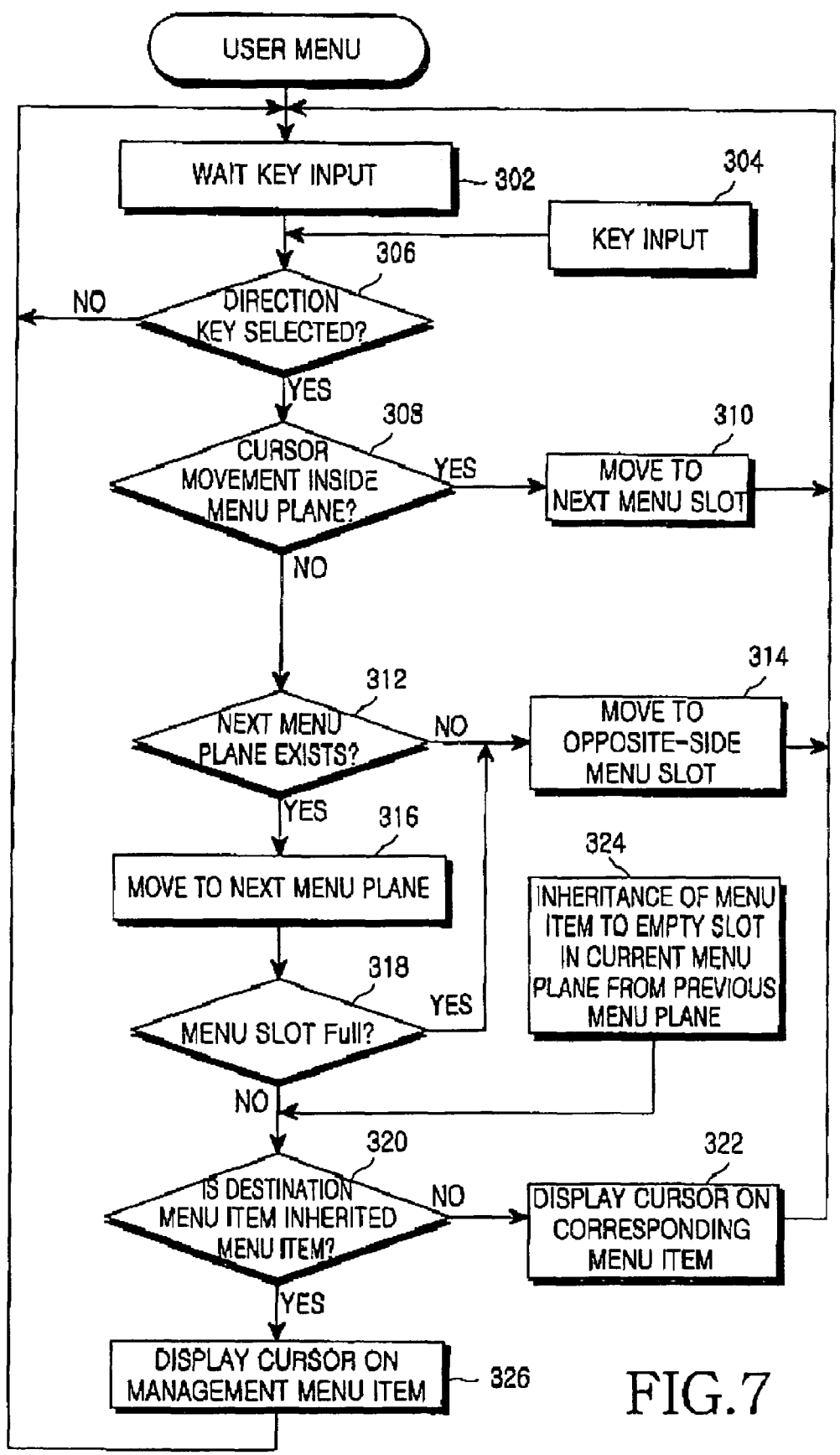
FIG. 7 is a flowchart illustrating a method of accessing a menu composed of multi-dimensional planes in a mobile communication terminal according to an embodiment of the present invention.

FIG. 7 is a flowchart illustrating a method of accessing a menu composed of multi-dimensional planes in a mobile communication terminal according to one embodiment of the present invention, for example, when a user selects a user-setting menu.

When a user registers user menus that include frequently used menus from all menus in the mobile communication terminal, multi-dimensional menu planes are generated as described above, and the user may access the menu according to a control flow as shown in FIG. 7.

Referring to FIG. 7, when a user selects a user-setting menu in a mobile communication terminal, the control unit 100 thereof waits for a key input from the user in step 302. When the control unit 100 receives the key input from the user through an interface unit 120 in step 304, the control unit 100 moves to step 306. Here, the interface unit 120 may be a key matrix or a touch screen as mentioned above. Then, the control unit 100 checks if the key selected by the user in step 306 is, for example, one of the up/down/left/right direction keys. When the key selected by the user is the direction key, the control unit 100 moves to step 308 to determine whether the cursor movement made by the direction key is inside the menu plane. That is, the control unit 100 determines whether the user's selection of the direction key moves the menu selection cursor on the menu plane out of the menu plane. When it is determined that the menu selection cursor moves to a menu item in the menu plane, the control unit 100 moves to step 310 to place the menu selection cursor at the menu item.

When it is determined that the menu selection cursor moves out of the menu plane, the control unit 100 moves to step 312 to check if there is a next menu plane. When it is checked that there is no next menu plane, the control unit 100 moves to step 314 to move the menu selection cursor to a menu slot at a position opposite to its present position in the menu plane, and returns to step 302 to wait for a key input from the user.

If it is determined that there is a next menu plane, the control unit 100 moves to step 316 to display the next menu plane on the display unit 140, and moves the menu selection cursor to the next menu plane. Then, in step 318, the control unit 100 determines whether menus are registered in all menu slots in the next menu plane. If it is determined that there is an empty menu slot, to which no menu item is registered, in step 324, the control unit 100 enables the empty menu slot, currently on display, to inherit the corresponding menu item from the previous menu plane. For example, when there are three empty menu items in the next menu plane as mentioned above, the empty menu items automatically inherit the corresponding menu items from the previous menu plane, respectively. This inheritance operation is to give the user a further chance to select a menu rather than keep the empty menu slots as they are, thereby eliminating a need to go back to the previous menu plane to access these menu items and thus reducing unnecessary key manipulations. Then, in step 320, the control unit 100 determines whether a menu item to be reached by the menu selection cursor is the inherited menu item. If it is determined that the menu item is the inherited menu item, the control unit 100 positions the menu selection at the terminal menu item on the display in step 32 and if not, positions it at the corresponding menu item.

The present invention revolutionizes the common menu configuration in the prior art, and provides a diversified menu constitution and a multi-dimensional cursor movement between menu planes, and various ways of accessing the menu, consequently improving the utilization and practical use of the menu.

Although various embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for organizing a menu in a mobile communication terminal, comprising:

a control unit for dynamically generating and deleting a plurality of menu planes according to a user's setting, each plane including at least one menu item;

a control unit for enabling multi-dimensional navigation between the generated menu planes wherein when there is an empty menu registration slot in the new menu plane, the control unit enables the empty menu item slot to inherit a menu item of a menu registration slot in a previous menu plane, the menu registration slot of the previous menu plane corresponding to the empty menu item slot, and the control unit enables the display unit to display the inherited menu item on the empty menu item slot; and a display unit for receiving the menu planes from the control unit and displaying the received menu planes under control of the control unit, wherein when a user registers a menu, the control unit generates a plurality of menu planes including at least one user menu registration slot connected to the registered menu, and, if a menu selection cursor moves from at least one user menu registration slot in a first menu plane of the plurality of menu planes so as to exit the first menu plane, the control unit moves the menu selection cursor to a second menu plane of the plurality of menu planes.

2. The device according to claim 1, wherein a user can add at least one menu item.

3. The device according to claim 1, wherein a user can delete said at least one menu item.

4. The device according to claim 1, wherein if the number of menu items on one of the plurality of menu planes exceeds a maximum allowable number of menu items, the control unit generates a new menu plane.

5. The device according to claim 1, wherein each menu registration slot in the plurality of menu planes is spatially continuous with and connected to a menu registration slot in its neighboring menu plane.

6. The device according to claim 5, wherein when the menu selection cursor positioned in one of the menu registration slot is moved by the user, the control unit moves the menu selection cursor to a menu registration slot in a menu plane adjacent to the menu registration slot.

7. The device according to claim 1, wherein selecting a key once moves the menu selection cursor positioned in said at least one user menu registration slot connected to the registered menu in the plurality of menu planes to another menu plane of the plurality of menu planes.

8. The device according to claim 1, wherein when the menu selection cursor moves to the second menu plane, the control unit causes the display unit to display a moving three-dimensional image such that a polyhedron including the first and second menu planes is rotated to change its front view from one menu plane to another menu plane.

9. A method for organizing a menu in a mobile communication terminal, comprising: generating dynamically and deleting a plurality of menu planes according to a user's setting, each plane including at least one menu item;
generating a first menu plane of a polyhedron including at least one menu registration slot associated with a registered menu when a menu is registered by a user; and
registering a menu item to a menu registration slot of the generated menu plane of the polyhedron;
displaying a second menu plane of a plurality of menu planes if a menu selection cursor moves from said at least one menu registration slot so as to exit the first menu plane of the plurality of menu planes; and
enabling an empty menu item slot to inherit the menu item of the menu registration slot in the first menu plane corresponding to the empty menu slot if there is an empty menu item slot in the second plane, displaying the inherited menu item on the empty menu slot.

10. The method according to claim 9, further comprising the step of generating a second menu plane including at least one menu registration slot when a menu is additionally registered by the user.

11. The method according to claim 10, further comprising:
displaying a moving three-dimensional image on a display unit such that a polyhedron including the first and second menu planes is rotated to change its front view from one menu plane to another menu plane, when the menu selection cursor moves to the second menu plane.

12. The method according to claim 10, wherein the menu selection cursor positioned in said at least one user menu registration slot connected to a registered menu in the plurality of menu planes can move to another menu plane of the plurality of menu planes by selecting a key once.

* * * * *